Oct. 13, 1970    S. P. NEWBERRY    3,534,219
CASCADED ELECTRON OPTICAL SYSTEM
Filed Jan. 3, 1969    7 Sheets-Sheet 4

Fig. 5.

Inventor:
Sterling P. Newberry,
by Marvin Snyder
His Attorney.

United States Patent Office 3,534,219
Patented Oct. 13, 1970

3,534,219
CASCADED ELECTRON OPTICAL SYSTEM
Sterling P. Newberry, Schenectady, N.Y., assignor to General Electric Company, a corporation of New York
Filed Jan. 3, 1969, Ser. No. 788,770
Int. Cl. H01j 29/80
U.S. Cl. 315—18                                    20 Claims

ABSTRACT OF THE DISCLOSURE

Precise control of an electron beam impinging on a large area receiving surface is achieved by employing, between the electron source and the receiving surface, a first matrix of electron deflection apparatus and by employing, intermediate the receiving surface and the first matrix, but close to the receiving surface, a second matrix of electron deflection apparatus of sufficient size to cover substantially all of the receiving surface. A predetermined one of the first matrix of lenses serves to direct the electron beam onto a predetermined one of the second matrix of lenses which provides fine control of the beam as it is swept over the underlying portion of the receiving surface.

---

This invention relates to electron beam apparatus, and more particularly to means for controlling the position of impingement of an electron beam on a large area receiving surface to a level of precision hitherto unattainable on large surfaces.

Electron beam apparatus has proven to be a versatile tool in many diverse environments. In addition to its more conventional but vital function in electron and cathode ray tubes, electron beams have also been applied to microscopy, welding, material shaping and data processing. The present invention is concerned especially with the latter two applications.

The advent of integrated circuits has spawned a whole new field of technology for the purpose of fabricating these devices. Since one of the goals sought to be attained in fabrication of integrated circuits is cheap and reliable mass production, the fabrication apparatus must be fast-acting and highly precise. The apparatus of the instant invention is well-suited to assist in attainment oft his goal since the electron beam thereof may be positioned precisely and virtually instantaneously. This eliminates any need for mechanical motion in the system.

In the field of data processing, a high capacity, random access memory of higher bit storage density than heretofore attainable, and which permits rapid data storage and retrieval, would be quite advantageous. Such random access memory is available through use of the instant invention. Moreover, because of the high bit capacity, the cost of the system calculated on a per-bit basis is extremely low.

In S. P. Newberry copending application Ser. No. 671,353, filed Sept. 28, 1967, and assigned to the instant assignee, methods and apparatus for utilizing electron beams in fabricating integrated circuits are described and claimed. By employment of the present invention in accordance with the teachings of the aforementioned copending Newberry application, integrated circuit production rates may be greatly increased since more semiconductor surface area may be exposed to the electron beam before requiring replacement with a new, unexposed semiconductor. Since the semiconductor replacement operation is relatively time-consuming in comparison with the other operations involved in electron beam fabrication of integrated circuits, the present invention increases speed of integrated circuit fabrication by decreasing the number of replacement operations required in fabricating any given large number of integrated circuits.

In J. F. Norton copending application Ser. No. 717,500, filed Apr. 1, 1968, and assigned to the instant assignee, a semiconductor radiation detecting wafer is described and claimed. The wafer, having a pattern of radiation absorbing regions coated over the incident radiation receiving surface, is employed as a digital data storage device which is interrogated by controllably deflecting an electron beam over predetermined surface portions thereof such that the beam impinges upon either the semiconductor or an absorbing region. By employment of the present invention in accordance with the teachings of the aforementioned copending Norton application, data storage capacity can be greatly increased since more area of the storage device can be covered by the controllably deflected electron beam.

A system for precise control of an electron beam is described in a paper by S. P. Newberry entitled, "Problems of Microspace Information Storage," appearing in the Fourth Electron Beam Symposium (Mar. 29–30, 1962), published by Alloyd Electronics Corporation, Boston, Mass., and again in "The Fly's Eye Lens—A Novel Electron Optical Component for Use With Large Capacity Random Access Memories," by S. P. Newberry in volume 29 of the American Federation of Information Processing Societies, Conference Proceedings, published by Spartan Books, Washington, D.C. (November 1966). The system therein described comprises an ultrahigh density memory wherein impingement of an electron beam on a storage medium is controlled by an objective lens made up of a matrix of minute electron optical lenses, herein referred to as lenslets. This matrix of lenslets is superficially similar in appearance to the compound eye of an ordinary housefly and therefore is designated a Fly's Eye lens. By utilizing coarse deflection of the electron beam so as to strike only a desired lenslet of the matrix, the lenslet thus struck positions the beam to ultimately impinge upon the storage medium at the desired point. Although the coarsely deflected beam may not strike the desired lenslet at dead center, the accuracy with which the beam strikes the storage medium remains unimpaired so long as even a portion of the beam strikes the desired lenslet.

A system of the type described in the aforementioned Newberry paper offers many advantages over conventional memories, provided the electron beam strikes the lenslets at an angle of incidence close to the normal with respect to the plane of the lenslet matrix. However, there exists a partical limit to the number of lenslets which may comprise the matrix, since coarse deflection of the electron beam cannot be accomplished over an angle of more than a few degrees without loss of accuracy due to the lower angle of incidence with respect to the plane of the lenslet matrix. By striking the lenslets at an angle of incidence which deviates appreciably from the normal with respect to the plane of the lenslet matrix, the electron beam may impinge upon more than one lenslet at a time. The instant invention concerns a method and apparatus wherein the number of lenslets controlling the electron beam is virtually limitless. This condition is achieved by using cascade matrices of electron lenses, thereby requiring that the electron beam pass through more than one electron lens prior to impingement upon the electron receiving surface of the electron target.

Accordingly, one object of the invention is to provide a method and apparatus for achieving precise control of deflection of an electron beam over a wide area without requiring large angle deflection of the beam at any single location along the beam.

Another object is to provide a method and apparatus for accurately achieving rapid changes in location of impingement of an electron beam on a large area receiving surface.

Another object is to provide a system capable of accurately positioning the point of impingement of an electron beam within a small portion of a large area receiving surface.

Another object is to provide data storage and readout apparatus having higher storage capacity than previously attainable with systems employing an electron beam for both reading and writing.

Briefly, in accordance with a preferred embodiment of the invention, apparatus for precisely controlling the point of impingement of an electron beam on a receiving surface comprises means producing a stream of electrons directed toward a receiving surface, a first matrix of electron lenses with electron deflection capability positioned between the electron stream producing means and the receiving surface, and at least a second matrix of electron lenses with electron deflection capability positioned between the first matrix and the receiving surface. The number of electron lenses of the second matrix is at least equal to the number of electron lenses of the first matrix.

In accordance with another preferred aspect of the invention, a method for precisely controlling the point of impingement of an electron beam on a receiving surface comprises the steps of generating a beam of electrons directed toward a receiving surface, coarsely deflecting the beam of electrons in the general direction of a desired point of impingement on the receiving surface, finely deflecting the coarsely deflected beam of electrons toward the desired point of impingement so as to correct the path of the beam, and further deflecting the finely deflected beam to impinge on the surface precisely at the desired point of impingement.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
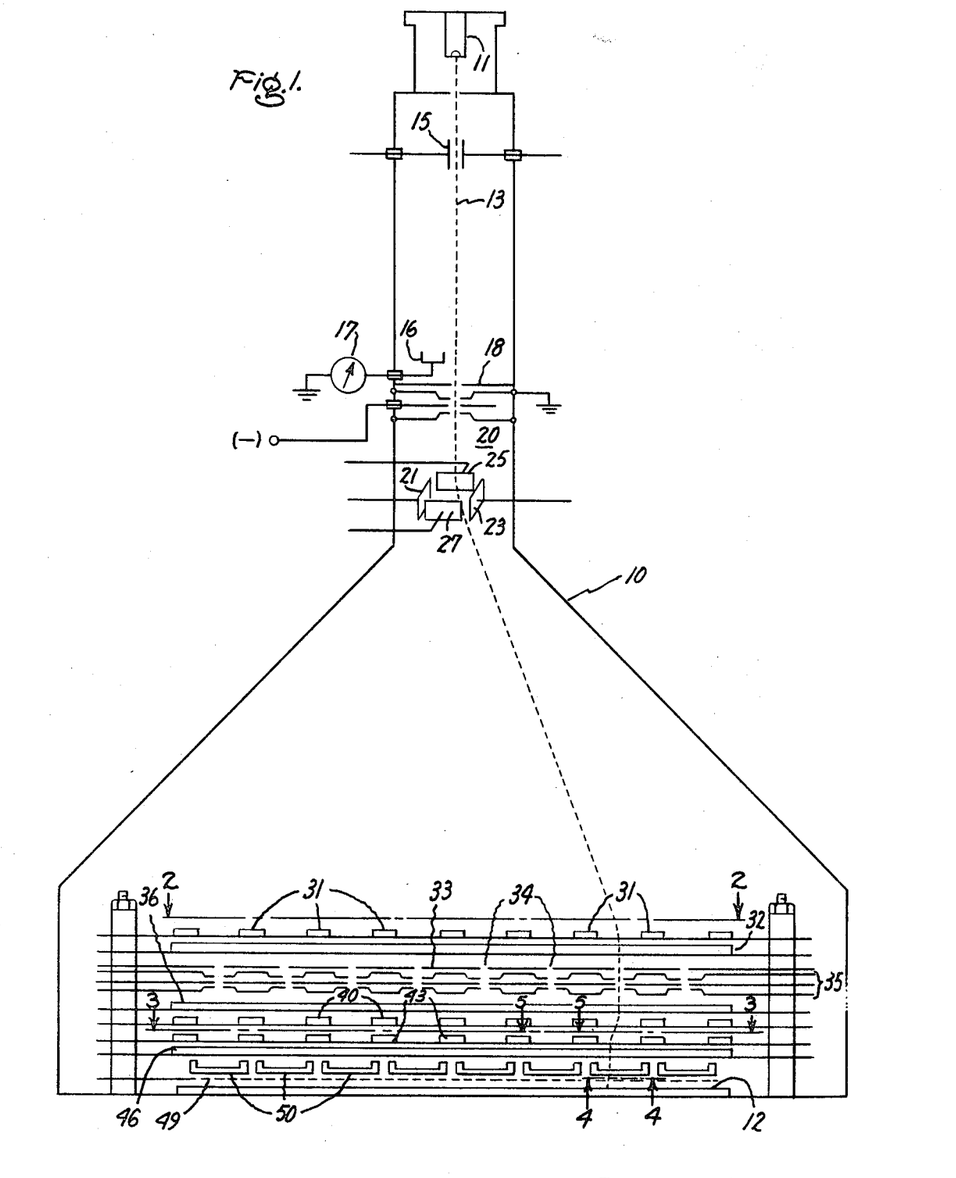
FIG. 1 is a simplified sectional view of apparatus embodying the electron optical system of the invention.

In FIG. 1, a simplified sectional view of apparatus embodying the electron optical system of the instant invention is illustrated. The apparatus comprises an evacuated envelope 10 having a source of electrons 11, such as a dispenser cathode, situated at one end thereof, and a data storage medium 12 on which the emitted electrons impinge disposed across the widened portion of envelope 10 at the opposite end thereof. Storage medium 12 may comprise a semi-conductor wafer having a pattern of radiation absorbing regions coated over its incident radiation receiving surface and which is interrogated by impingement of an electron beam on the surface thereof, such as described and claimed in J. F. Norton application Ser. No. 717,500, filed Apr. 1, 1968 and assigned to the instant assignee. Alternatively, storage medium 12 may comprise a dielectric layer and a juxtaposed semiconductive layer sandwiched between a tin oxide electrode and an electron transparent aluminum electrode, which exhibits localized breakdown in the dielectric layer when the semiconductive layer is struck by a writing electron beam, and which may thereafter be read out by detecting current induced through the storage medium by impingement of the electron beam at predetermined locations on the medium. A storage medium of this type is described and claimed in D. W. Skelly et al. application Ser. No. 749,457, filed Aug. 1, 1968 and assigned to the instant assignee. In the alternative, the storage medium may be read out by detecting secondary emission of electrons therefrom.

Electron beam 13 passes through a beam confining aperture 14 and thence between a pair of electrostatic deflection plates 15 which are employed to deflect the beam out of a Faraday cup 16 whenever the apparatus is to be switched into a read or write mode. Faraday cup 16 is grounded through a current meter 17 which permits measurement of beam current.

The electron beam is passed through an apertured plate 18 which is employed to sharply define the beam, and is collimated by an electrostatic condenser lens 20. The collimated beam then enters one end of a coarse deflection region comprising a pair of horizontal or X electrostatic deflection plates 21 and 23, which deflect the beam in the horizontal or X direction, and a pair of vertical or Y deflection plates 25 and 27, which deflect the beam in the vertical or Y direction. The other end of the coarse deflection region is demarcated by a pair of interdigitated horizontal or X electrostatic deflection bars 31, which deflect the beam in the horizontal or X direction, and a plurality of interdigitated vertical or Y electrostatic deflection bars 32, which deflect the beam in the vertical or Y direction. If the beam is deflected in one horizontal direction by horizontal deflection plates 21 and 23, it is deflected in the opposite horizontal direction by horizontal deflection bars 31; similarly, if the beam is deflected in one vertical direction by vertical deflection plates 25 and 27, it is deflected in the opposite vertical direction by vertical deflection bars 32. As used herein, the terms horizontal and vertical relate to orthogonal directions within any plane parallel to the plane of the incident radiation receiving surface of storage medium 12.

Figure 2:
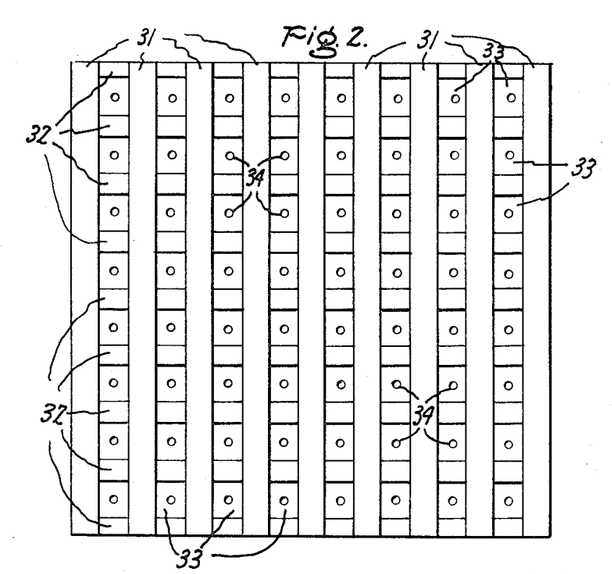
FIG. 2 is a top view of the entire lower portion of the electron optical system as viewed along line 2—2 in the apparatus of FIG. 1.

Situated beneath the matrix of deflection bars 31 and 32 is a beam confining plate 33 with apertures 34 therein, one aperture being situated in the area enclosed between each pair of adjacent vertical deflection bars and each pair of adjacent horizontal deflection bars, respectively. The locations of apertures 34 in plate 33 with respect to horizontal deflection bars 31 and vertical deflection bars 32 is illustrated in FIG. 2, which is a plan view of the apparatus as seen along line 2—2 in FIG. 1.

Beneath beam confining plate 33 in FIG. 1, and aligned with apertures 34, a plurality of condenser lenses 35 are situated. Each of lenses 35 serves to collimate the beam after it has emerged from the one of apertures 34 respectively in alignment therewith. The electron beam then analog converters which control deflection of the electron beam in the horizontal direction are designated 101, 103 and 105, respectively, while the digital-to-analog converters which control deflection of the electron beam in the vertical direction are designated 102, 104 and 106, respectively. Each of digital-to-analog converters 101–106 is driven by an address command module 107 in response to signals received from external apparatus such as a computer (not shown). The address command module comprises circuitry which converts the signal received from the external apparatus into digital signals representative of voltage necessary to deflect the beam of electrons in their flight toward storage medium 12. Module 107 is programmed to provide, for any target location on the surface of storage medium 12, an electron path without any unduly sharp angles of electron beam deflection.

The electron beam initially passes between electrostatic deflection plates 15 and then either passes through the region enclosed by coarse deflection plates 21, 23, 25, and 27, in which case the beam is on, or the voltage on deflection plates 15 is such that the electron beam is deflected into Faraday cup 16 shown in FIG. 1, in which case the electron beam is off. Control of the voltage on deflection plates 15 is furnished from a deflection driver circuit 109 which, in turn, is controlled by a read/write gate 108; that is, whenever the electron beam is to be employed for reading or writing, read/write gate 108 actuates deflection driver 109 so as to direct the electron beam through the region enclosed by coarse deflection plates 21, 23, 25, and 27, rather than permit the beam to impinge on Faraday cup 16 and thereupon be grounded. However, during periods of inactivity, deflection driver circuit 109 is actuated to cause deflection plates 15 to deflect the beam to the Faraday cup, thereby maintaining the apparatus in an off condition. Read/write gate 108, in turn, is controlled by a read/write control circuit 110 which is driven by external apparatus, such as the previously mentioned computer which controls address command module 107. Hence, whenever the computer requires a read or write operation to be performed, read/write control circuit 110, after an appropriate delay introduced by the computer in order to allow the electron deflection voltages enough time to reach their predetermined values drives read/write gate 108 so as to cause the electron beam within enclosure 10 of the apparatus shows in FIG. 1, to enter the region enclosed by the coarse deflection plates.

A write enable switch 111 and a read enable switch 112 are driven from read/write control 110 respectively by a write output signal, designated W, and a read output signal, designated R, depending upon whether the signal supplied to read/write control 110 requires either a write operation or read operation to be performed by the apparatus shown in FIG. 1. The outputs of write enable switch 111 and read enable switch 112 are each connected to storage device 12 and supply voltages thereto through a common circuit in order to facilitate the write or read operation. The write enable switch and read enable switch each produce a different amplitude of output voltage. Thus, where the storage medium described and claimed in the aforementioned Skelly et al. application Ser. No. 749,457 is employed, a larger voltage is furnished to storage device 12 from write enable switch 111 than from read enable switch 112. This permits the electron beam to operate upon storage medium 12 in the desired manner. Reference may be made to the aforementioned Skelly et al. application Ser. No. 749,457 for additional details regarding the functioning of storage device 12.

Digital-to-analog converter 101 applies a voltage across coarse deflection plates 21 and 23, and also applies a voltage across interdigitated horizontal deflection bars 31 such that bars 22, connected in common, receive voltage of the same polarity as that of deflection plate 23, while deflection bars 24, connected in common, receive voltage of the same polarity as that applied to deflection plate 21. In similar fashion, digital-to-analog converter 102 applies a voltage across coarse deflection plates 25 and 27, and also applies a voltage across interdigitated vertical deflection bars 32 by applying a voltage to deflection bars 26, connected in common, of the same polarity as that applied to coarse deflection plate 25, and a voltage to deflection bars 28, connected in common, of the same polarity as that applied to coarse deflection plate 27. This arrangement of deflection voltages causes the electron beam which enters the region enclosed by coarse deflection plates 21, 23, 25 and 27 to be deflected in one direction and, upon entering the region enclosed by deflection bars 31 and 32, to be deflected in the opposite direction. This insures that the coarsely deflected electron beam passes through the openings in apertured plate 33 in a direction normal to the plane of plate 33, thereby achieving the orthogonal electron beam landing which promotes advantageous operation of the apparatus. Although deflection bars 22 and 24 are shown at different levels, as are bars 26 and 28, this is merely schematic in order to facillitate illustration of the electrical connections made to the interdigitated bars.

Digital-to-analog converter 103 applies a voltage across interdigitated horizontal deflection bars 40 such that deflection bars 41, connected in common, receive voltage of one polarity and deflection bars 42, connected in common, receive voltage of the opposite polarity. In similar fashion, digital-to-analog converter 103 applies a voltage across interdigitated horizontal deflection bars 43 such that deflection bars 44, connected in common, receive voltage of one polarity and deflection bars 45, connected in common, receive voltage of the opposite polarity. The polarity of voltage supplied by digital-to-analog converter 103 to deflection bars 42 and 43 is such as to create electric fields within the regions between adjacent ones of deflection bars 40 which are oppositely polarized with respect to electric fields likewise created within the regions between adjacent ones of deflection bars 43. The effect of the oppositely polarized electric fields is such as to cause opposite deflections of the electron beam as it passes between deflection bars 40 and 43; that is, if the beam is deflected in one direction by deflection bars 40 it is deflected in the opposite direction by deflection bars 43. Although bars 41 and 42 are shown at different levels, as are bars 44 and 45, this is merely schematic in order to facilitate illustration of the electrical connections made to the interdigitated bars.

Digital-to-analog converter 104 applies a voltage across vertical deflection bars 36 such that deflection bars 37, connected in common, receive voltage of one polarity and deflection bars 38, connected in common, receive voltage of the opposite polarity. In similar fashion, vertical deflection bars 46 receive a voltage from digital-to-analog converter 104 such that deflection bars 47, connected in common, receive voltage of one polarity and deflection bars 48, connected in common, receive voltage of the opposite polarity. In addition, the electric fields established between adjacent ones of deflection bars 36 are polarized oppositely to the electric fields established between adjacent ones of deflection bars 46, so that if the electron beam is deflected in one direction by vertical deflection bars 36, it is deflected in the opposite direction by vertical deflection bars 46. This enables the electron beam to impinge upon the desired one of Fly's Eye lenses 50 in an orthogonal and therefore controllable manner. Again, while deflection bars 37, which are connected in common, are shown at a different level than deflection bars 38, which are connected in common, and deflection bars 47, which are connected in common, are shown at a different level than deflection bars 48, which are connected in common, bars 37 and 38 are actually at a common level, and bars 47 and 48 are actually at a common level. The deflection bars are shown at separate levels only to facilitate illustration of the electrical connections made to the interdigitated bars.

passes through a matrix comprising a plurality of interdigitated vertical deflection bars 36 and a plurality of interdigitated horizontal deflection bars 40. Thereafter, the beam passes through a matrix comprising a plurality of interdigitated horizontal deflection bars 43 and a plurality of interdigitated vertical deflection bars 46. Thus, if the beams is deflected in one vertical direction by vertical deflection bars 36, it is deflected in the opposite vertical direction by vertical deflection bars 46; similarly, if the beam is deflected in one horizontal direction by horizontal deflection bars 40, it is deflected in the opposite horizontal direction by horizontal deflection bars 43.

Figure 3:
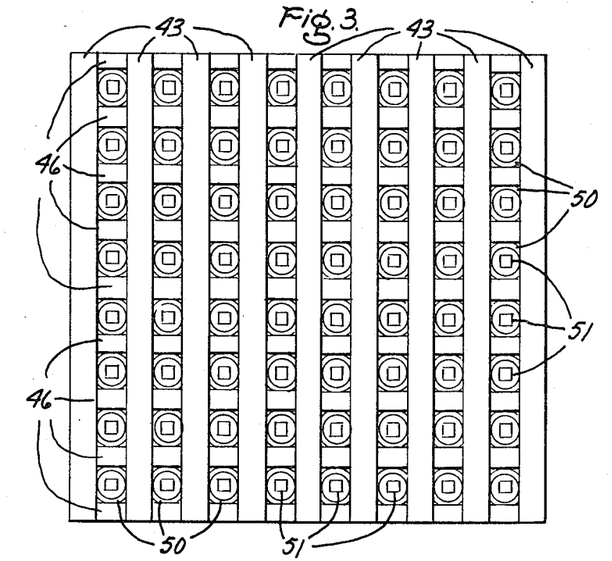
FIG. 3 is a top view of the intermediate stage of the electron optical system as viewed along line 3—3 in the apparatus of FIG. 1.

Situated beneath deflection bars 43 and 46 are a plurality of Fly's Eye lenses 50, which provide the final, fine deflection of electron beam 13. The Fly's Eye lenses are arranged in an array and aligned in the spaces defined by horizontal deflection bars 40 and 43 and vertical deflection bars 36 and 46, as illustrated in FIG. 3 which is a plan view of the apparatus as seen along line 3—3 in FIG. 1. Each of the Fly's Eye lenses illustrated in FIG. 3 contains, within an active region 51 a rectangular array of small openings through which the electron beam may pass; that is, the electron beam may enter any predetermined Fly's Eye lens through a predetermined one of the small openings in active region 51 of the predetermined Fly's Eye lens. A grid 49 for collecting secondary emission electrons emitted by storage medium 12 is positioned between the array of Fly's Eye lenses 50 and storage medium 12, as shown in FIG. 1.

Figure 4:
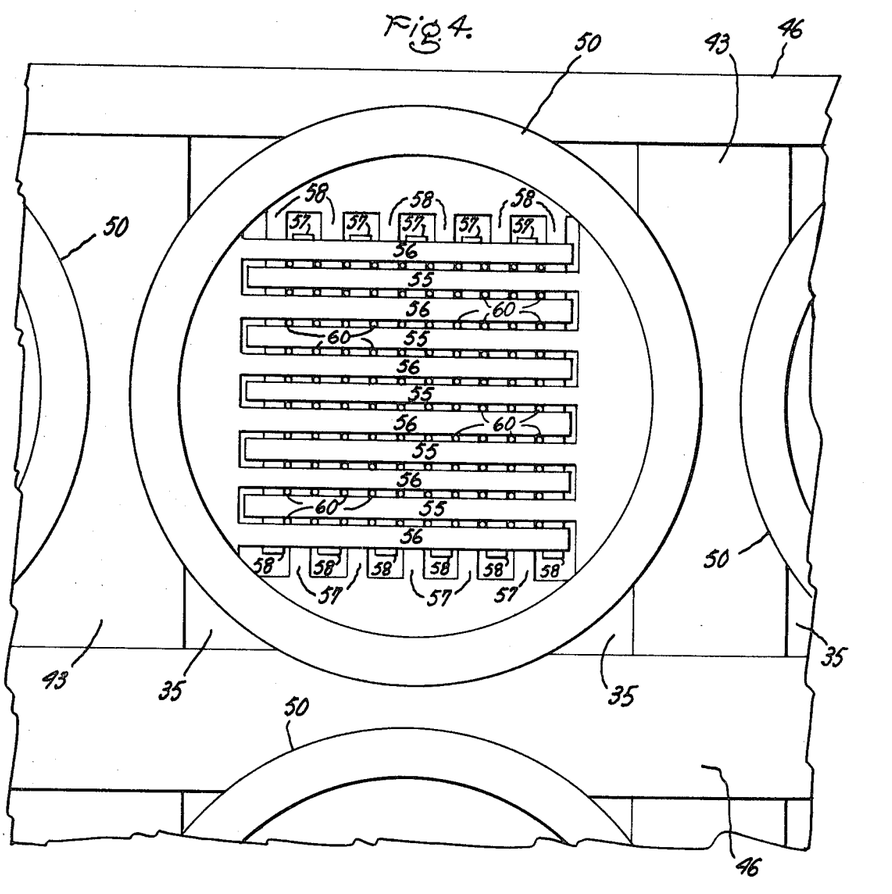
FIG. 4 is a bottom view of a portion of the final stage of the electron optical system as viewed along line 4—4 in the apparatus of FIG. 1.

FIG. 4 is a plan view of the beam-emerging side of one of Fly's Eye lenses 50, as viewed along line 4—4 in FIG. 1. The lens 50, which is shown in its entirety, comprises a pair of interdigitated vertical deflection bars 55 and 56 and a pair of interdigitated horizontal deflection bars 57 and 58 arranged in the form of a matrix which, when situated int he matrix of Fly's Eye lenses in FIG. 1, constitutes a submatrix therein. Each set of interdigitated deflection bars is electrically insulated from every other set of deflection bars. In each region surrounded by adjacent ones of each of deflection bars 55, 56, 57 and 58 is situated a respective opening 60 in an electron focusing lenslet within the Fly's Eye lens itself. FIG. 4 also illustrates the location and orientation of Fly's Eye lenses 50 with respect to vertical deflection bars 46, horizontal deflection bars 43 and array of collimating lenses 35.

Figure 5:
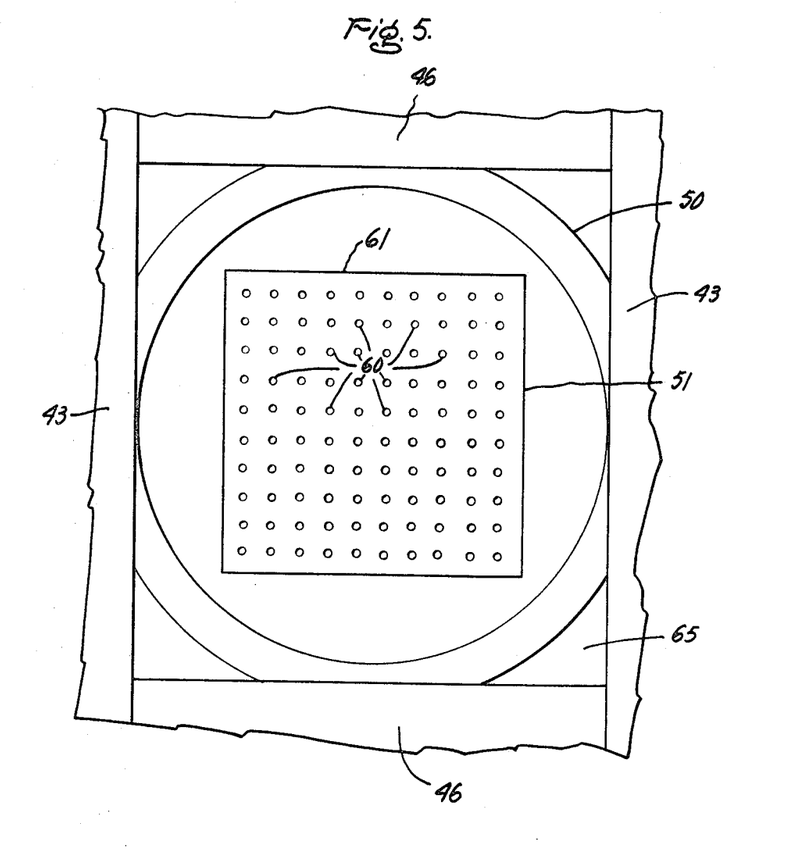
FIG. 5 is a top view of the portion of the final stage of the electron optical system shown in FIG. 3, as viewed along line 5—5 in the apparatus of FIG. 1.

FIG. 5 is a plan view, taken along line 5—5 in FIG. 1, of the beam-entering side of one of Fly's Eye lenses 50, showing the rectangular array of small openings 60 in a plate 61 comprising a portion of a plurality of collimating lenslets within the Fly's Eye lens. The rectangular array of small openings 60 is situated within active region 51 of the Fly's Eye lens. The active region is thus the region of the Fly's Eye lens wherein an electron beam which impinges thereon may be deflected in accordance with voltages applied to the lens. The location and orientation of the Fly's Eye lens shown in FIG. 5 is illustrated with respect to vertical deflection bars 46, horizontal deflection bars 43, and a Fly's Eye lens mounting board 65.

Figure 6:
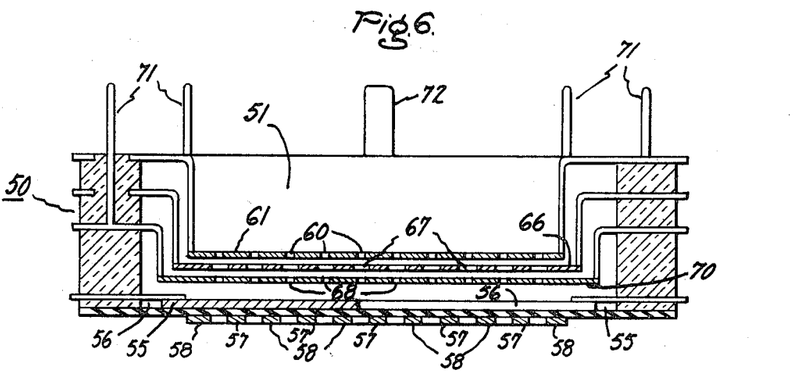
FIG. 6 is a cross-sectional view of the portion of the final stage of the electron optical system shown in FIGS. 4 and 5.

FIG. 6 is a simplified, partially cut-away sectional view of a typical one of Fly's Eye lenses 50, such as described in the aforementioned articles by S. P. Newberry. Lens 50 includes a plurality of horizontal deflection bars 57 interdigitated with an insulated from a plurality of horizontal deflection bars 58, and a plurality of vertical deflection bars 55 interdigitated with and insulated from a plurality of vertical deflection bars 56. Openings 60 in plate 61 are in respective alignment with the open spaces between adjacent horizontal deflection bars 57 and 58 in respective alignment with the open spaces between adjacent vertical deflection bars 55 and 56. Apertures 60 in plate 61 are also aligned with apertures 67 and 68 in plates 66 and 70 respectively.

Apertures plates 61, 66 and 70 comprise an electrostatic lens structure, made up of a plurality of tiny collimating lenses or lenslets, for collimating a beam of electrons entering any one of apertures 60 in plate 61 prior to passage of the electron beam between deflection bars 55, 56, 57 and 58. By energizing the deflection bars with predetermined voltages, the collimated electron beam may then be controlled to impinge upon a desired location. Contact to the various lens plates and deflection bars is made through particular ones of contact pins 71 which permit arrangement of the Fly's Eye lenses on a mounting board. A key pin 72 insures correct orientation of each Fly's Eye lens on the mounting board.

Figure 7:
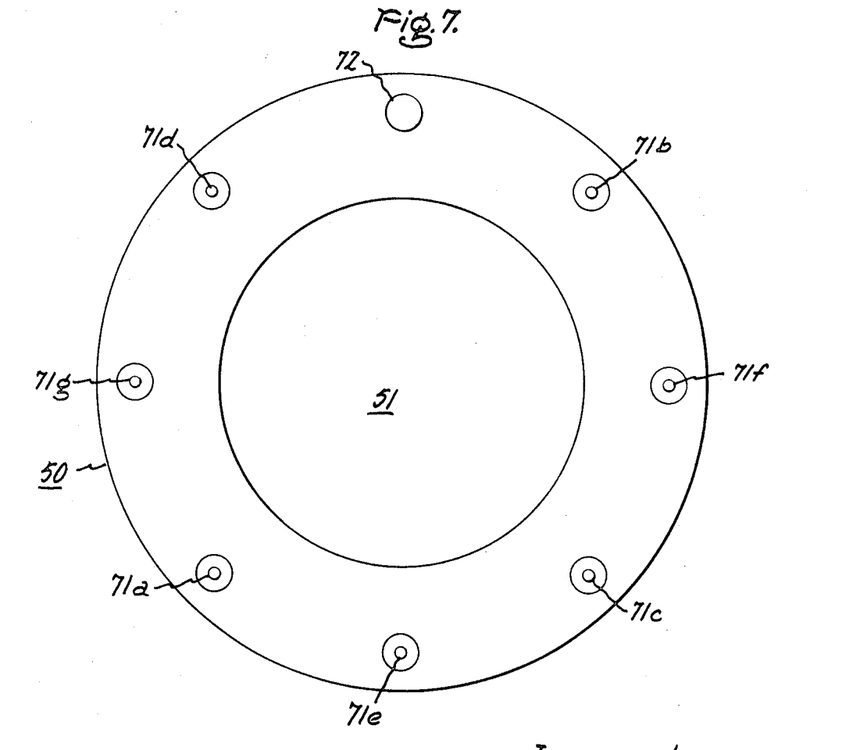
FIG. 7 is a schematic illustration of the contact pin arrangement on the upper side of the apparatus shown in FIG. 6.

FIG. 7 is a base diagram of Fly's Eye lens 50 of FIG. 6 showing the location of contact pins 71 and key pin 72 around the base of Fly's Eye lens 50. Contact pins 71 are distinguished from each other by letter designations so that pins 71a and 71b supply voltages to vertical deflection bars 55 and 56 respectively, pins 71c and 71d supply voltages to horizontal deflection bars 57 and 58 respectively, pin 71e supplies voltage to center plate 66 of the electrostatic lens structure, and pins 71f and 71g supply ground potential to outer plates 61 and 70 of the electrostatic lens structure.

Figure 8:
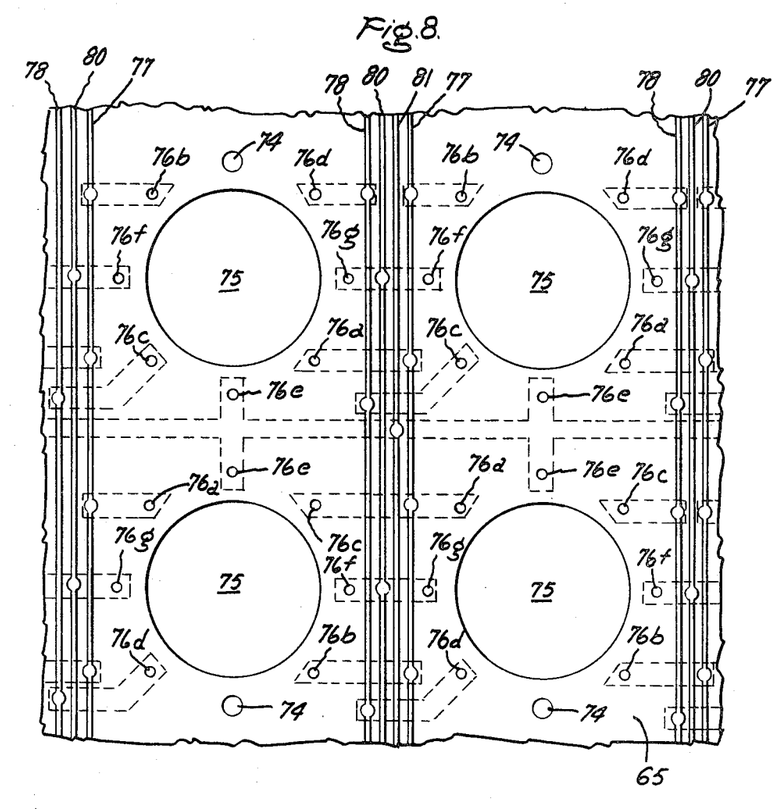
FIG. 8 is a plan view of a portion of the upper side of a mounting board for holding the apparatus shown in FIGS. 5–7.

FIG. 8 is a top plan view of insulated mounting board 65 on which the Fly's Eye lenses of the final stage in the system are mounted, showing openings 75 cut in the board to permit impingement of the electron beam on the Fly's Eye lenses. Vertically-directed buses ade illustrated on the upper side of board 65, while electrical connections to the Fly's Eye lenses made through conductors on the underside of board 65 are shown dotted. Electrical contact between predetermined conductors on the underside of board 65 and predetermined buses on the upperside of the board is made directly through the board between its upper and lower sides at each widened region on the buses. For convenience, pin sockets 76 in board 65 through which the Fly's Eye lens contact pins make contact with the conductors on the underside of board 65 are indicated with letter designations corresponding to the Fly's Eye lens base diagram of FIG. 7. Thus, openings 76a, 76b, 76c, 76e, 76f, and 76g correspond respectively to contact pins 71a, 71b, 71c, 71d, 71e, 71f, and 71g and receive the contact pins therein. Opening 74 in board 65 receives key pin 72 of the Fly's Eye lens shown in FIGS. 6 and 7. Voltages to the Fly's Eye lens vertical deflection bars are supplied by buses 77, voltages to the Fly's Eye lens horizontal deflection bars are supplied by buses 78, ground potential is furnished to the electrostatic collimating lenses of the Fly's Eye lens through buses 80 and voltage to the center plate of the electrostatic collimating leans structure of the Fly's Eye lenses is furnished through bus 81.

Figure 9:
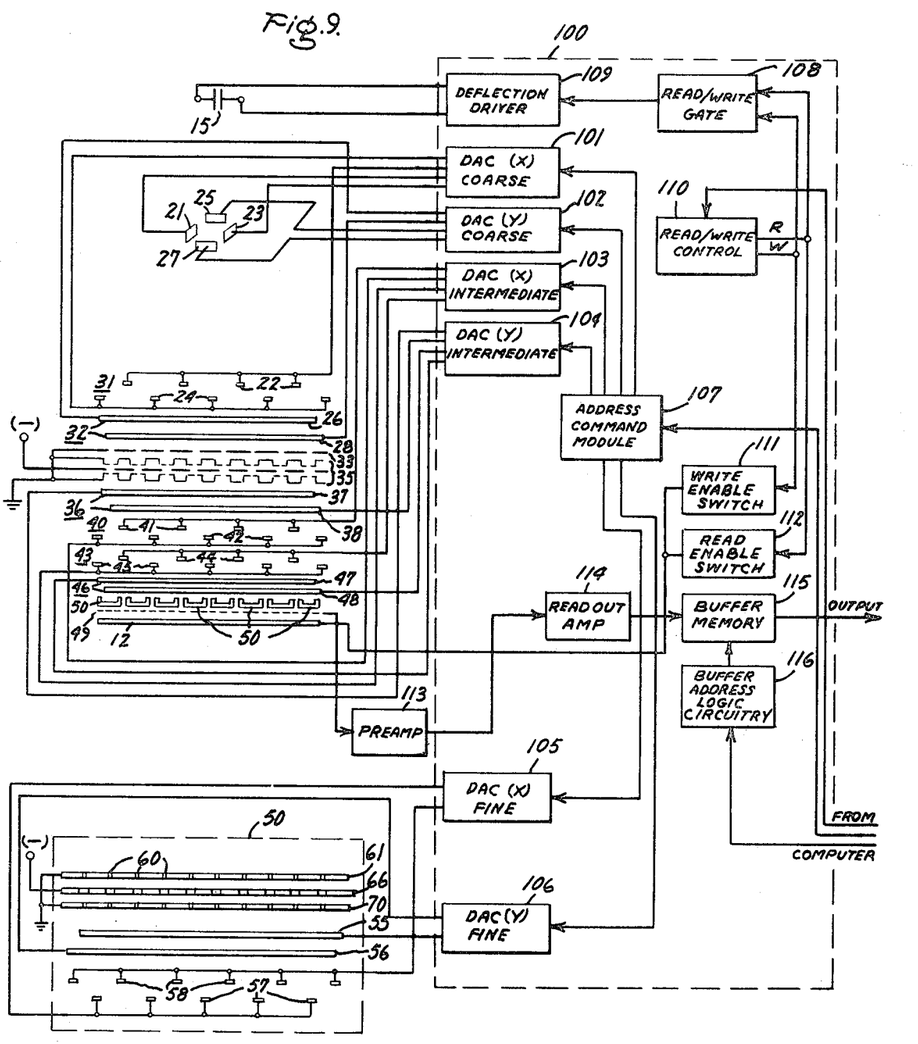
FIG. 9 is a part schematic and part block diagram showing circuit interconnections for operating the electron optical apparatus of the invention.

FIG. 9 illustrates circuit connections for controlling the electron optical apparatus of the invention. The illustrated electrodes are employed for focusing and deflecting the electron beam and correspond to electrodes illustrated within evacuated envelope 10 of the apparatus shown in FIG. 1. The electrodes illustrated in FIG. 9 are therefore designated with numbers which correspond respectively to those used in FIG. 1. The storage device employed in conjunction with the electron optical apparatus is also illustrated.

Circuitry 100 for controlling the voltages applied to the electrodes shown in FIG. 1 is shown within a dotted enclosure. This circuitry includes three pairs of digital-to-analog converters (DAC), each pair of which controls deflection in the horizontal (X) and vertical (Y) direction. One pair of digital-to-analog converters controls coarse deflection of the electron beam received from electron source, a second pair of digital-to-analog converters controls deflection of the electron beam received from the coarse deflection electrodes, and the third pair of digital-to-analog converters controls the ultimate deflection of the electron beam just before it impinges on the electron receiving surface and hence comprises a source of fine deflection voltages for the array of Fly's Eye lenses 50. The coarse, intermediate and fine digital-to- The array of Fly's Eye lenses 50, which are connected in common, is illustrated beneath interdigitated vertical deflection bars 46. Although no circuitry is shown connected to any of the Fly's Eye lenses shown situated directly beneath vertical deflection bars 48, a typical one of Fly's Eye lenses 50 is shown separately in order to illustrate the interconnection between each of the Fly's Eye lenses 50 and digital-to-analog converters 105 and 106. Vertical deflection bars 55 and 56 are shown at different levels only to facilitate illustration of the electrical connections made to the interdigitated bars; similarly, horizontal deflection bars 57 and 58 are shown at different levels in the drawing only to facilitate illustration of the electrical connections made to the interdigitated bars. It should be understood, however, that while bars 55 and 56 are physically at a common level, and bars 57 and 58 are physically at a common level, deflection bars 57 and 58 are physically situated at a common level beneath the level at which bars 55 and 56 are physically situated.

Digital-to-analog converter 105 applies a voltage across vertical deflection bars 55 and 56 so as to deflect the electron beam which emerges from the apertures in plate 70 in a vertical direction. Similarly, digital-to-analog converter 106 applies a voltage across horizontal deflection bars 57 and 58 so that the electron beam, in passing between any pair of adjacent deflection bars 57 and 58 is deflected in a horizontal direction. Since Fly's Eye lenses 50 comprise the final deflection stage of the electron optical apparatus, orthogonal landing of the electron beam, which is advantageous whenever the electron beam impinges upon an electron optical lens, is not necessary. Therefore, any angular impingement of the electron beam on storage device 12 is of substantially no consequence.

Situated between the array of Fly's Eye lenses 50 and storage device 12 is grid 49 upon which secondary emission electrons emanating from storage device 12 are collected. These secondary emission electrons form a readout signal from the electron optical apparatus and hence grid 49 is connected to the input of a preamplifier 113. Preamplifier 113 is preferably situated as close to grid 49 as possible, in order to increase the signal-to-noise ratio of the output signal during readout operation. The output signal from preamplifier 113 is furnished to a readout amplifier 114 situated within control apparatus 100. The signal which has been read out is then furnished to a buffer memory 115 wherein it is stored. The location of storage within buffer memory 115 is controlled by buffer address logic circuitry 116 in response to a signal received from the external control circuitry such as a computer. The buffer memory may be interrogated by external apparatus (not shown) which selectively furnishes the buffer memory with a desired address in order to read out the signal stored in the buffer memory at that address.

To recapitulate operation of the apparatus shown schematically in FIG. 9, the electron beam is turned on whenever it is desired to read or write data, by deflecting the electron beam into a region enclosed by coarse deflection plates 21, 23, 25, and 27. The beam is then coarsely deflected by the coarse deflection plates in conjunction with coarse deflection bars 31 and 32 such that deflection in any direction by the coarse deflection plates results in deflection in the opposite direction when the beam passes between the desired adjacent ones of vertical bars 31 and the desired adjacent ones of horizontal deflection bars 32. This deflection, which is controlled by the output voltages of digital-to-analog converters 101 and 102 in response to signals furnished by address command module 107, results in passage of the beam orthogonally through the desired opening in apertured plate 33.

The electron beam is next collimated by passage through electrostatic condenser lens 35 and enters an intermediate deflection region comprising an upper level of vertical deflection bars 36, an upper lever of horizontal deflection bars 40, a lower level of horizontal deflection bars 43 and lower level of vertical deflection bars 46. Deflection of the electron beam within this region is controlled by digital-to-analog converters 103 and 104 in response to output signals of address command module 107. As in the coarse deflection region, deflection of the beam in any direction by adjacent ones of the upper level of vertical deflection bars and adjacent ones of the upper level of horizontal deflection bars also produces deflection of the beam in the opposite direction by adjacent ones of the lower level of horizontal deflection bars and adjacent ones of the lower level of vertical deflection bars. Again, therefore, the beam impinges orthogonally upon the next stage which, in this instance, is the array of Fly's Eye lenses 50. Deflection of the electron beam through any one of Fly's Eye lenses 50 is controlled by digital-to-analog converters 105 and 106 which produce the ultimate, fine deflection of the electron beam which then impinges upon the storage device 12. This final deflection of the electron beam occurs in only one horizontal and vertical direction and is not compensated for by being subsequently deflected in the opposite direction in order to produce orthogonal impingement on storage device 12, since orthogonal impingement upon the storage device is not necessary. The path traversed by the electron beam is illustrated in FIG. 1.

Thus, to write information into storage device 12 with the apparatus shown in FIG. 9, address command module 107 supplies a digital signal to each of digital-to-analog converters 101–106 so as to insure that the converters produce output voltages of the proper amplitudes to direct the electron beam onto precisely the predetermined portion of storage device 12 desired to be written upon, without any unduly sharp electron beam deflection angles. After a predetermined delay sufficient to permit electron deflection voltages to settle to their steady values, read/write control 110 produces a write output signal at its output designated W, thereby causing write enable switch 111 to supply the proper amplitude of voltage to storage device 12 to permit writing upon the storage device to be achieved with the electron beam, and deflects the electron beam out of its Faraday cup by actuation of read/write gate 108. Writing of data on storage medium 12 thereupon takes place. Each time it is desired to write at a new location on storage device 12, a new digital address command is supplied from module 107 to each of digital-to-analog converters 101–106. Upon completion of the writing operation, read/write control 110 de-energizes its output W, thereby causing deflection of the electron beam back into the Faraday cup. At the same time, write enable switch 111 is de-energized.

To read stored information out of storage device 12, address command module 107 furnishes a digital signal to each of digital-to-analog converters 101–106, causing each converter to produce an output voltage of amplitude to deflect the electron beam jointly to a desired location on storage device 12 at which a stored bit of data is to be read out. After a predetermined delay introduced by the computer, read/write control 110 produces a read output signal at its output designated R, thereby causing read enable switch 112 to supply the proper amplitude of voltage to storage device 12 to permit secondary emission of electrons from the storage device to be achieved by impingement of the electron beam thereon, and deflects the electron beam out of the Faraday cup and through the region enclosed by coarse deflection plates 21, 23, 25 and 27. The electron beam thereupon impinges upon storage device 12 as before, but because a different amplitude of voltage is supplied to the storage device, secondary emission of electrons which occurs therefrom is directed toward secondary emission electron collecting grid 49. The rate of secondary emission differs in accordance with whether or not a bit has been stored at the location struck by the incident beam of electrons. The electrons secondarily emitted are collected on grid 49 so that an output signal is supplied to buffer memory 115 and stored therein at a location determined by buffer address logic circuitry 116. The data stored in buffer memory 115 are then available for readout therefrom by well-known conventional means. Upon completion of the readout operation, read/write control 110 causes de-energization of its output R, thereby de-energizing write enable switch 111 and at the same time redirecting the electron beam into the Faraday cup.

Figure 10:
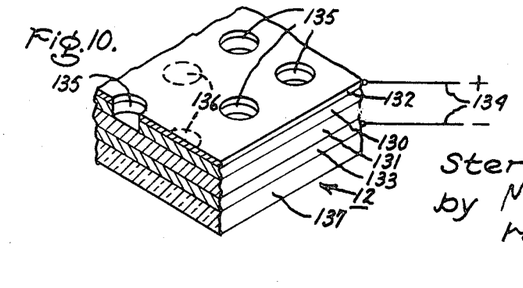
FIG. 10 is a cutaway isometric view of a portion of a storage medium which may be employed with the apparatus of FIG. 1.

FIG. 10 is a cutaway isometric view of a portion of one type of storage medium 12, such as that described and claimed in the aforementioned Skelly et al. application Ser. No. 749,457, with the direction of an incident electron beam indicated by an arrow. The storage medium generally comprises a dielectric layer 130 and a juxtaposed semiconductive layer 131 in which electron bombardment induces conduction, sandwiched between electrodes 132 and 133. Layer 131 may comprise lead oxide, for example. A voltage supplied by write enable switch 111, shown in FIG. 9, is impressed through a pair of leads 134 across electrodes 132 and 133 of the data storage medium so as to bias electrode 132 positive with respect to semiconductive layer 131. This voltage divides itself across layers 131 and 130 in a ratio tending to bias the dielectric material of layer 130 to its threshold of capacitive breakdown.

Although electrode 132 may be formed of any conductive metal, low density metals, such as aluminum or magnesium, are preferred when a relatively low energy electron beam, or beam potential of less than 8 kilovolts, is employed for writing. Because a high percentage, such as 6% or greater, of electron beam transmission through electrode 132 is desired, electrode 32 is preferably of a thickness less than 400 angstroms.

Dielectric layer 130 is generally comprised of a non-brittle, nonconductive material, preferably of a thickness such that voltage from the write enable switch exceeds the amplitude of capacitive breakdown voltage of the dielectric layer by at least 50%. A thin dielectric film, preferably less than 5,000 angstroms in thickness, serves to facilitate high resolution recording. Dielectric layer 130 may typically comprise a hexachlorobutadiene polymer film, deposited in the manner described and claimed in A. N. Wright copending application Ser. No. 530,971, filed Nov. 19, 1966 and assigned to the instant assignee. Other conventional dielectric materials however, such as described in the aforementioned Skelly et al. application Ser. No. 749,457, may be employed in the alternative.

Electrode 133, remote from the electron source, comprises a conductive material, preferably a metallic film of less than 10,000 angstroms thickness. Typically, electrode 133 is comprised of tin oxide. A substrate 137 of soda lime glass is employed as a mechanical support for storage medium 12. Leads 134 are attached to electrodes 132 and 133 in the manner set forth in the aforementioned Skelly et al. application Ser. No. 749,457.

To write digital information into storage medium 12, an electron beam is selectively impinged in a controlled, coded pattern upon upper electrode 132 so as to penetrate through dielectric 130 into layer 131, thereby reducing the electrical impedance of the electron bombarded regions of layer 131. The resulting reduction in voltage across the electron bombarded regions of layer 131 effects an increase in the potential applied across juxtaposed dielectric layer 130 by an amount sufficient to exceed the capacitive breakdown potential of the dielectric layer in the electron bombarded regions. Dielectric layer 130, along with a portion of the overlaying conductive electrode, is consequently exploded away by the capacitive breakdown to form apertures 135 corresponding to recorded digital information of a selected type, as binary ONES for example. Regions 136, showed dotted, represent regions which are within range of the electron beam but not struck thereby. In this respect therefore, regions 136 also represent recorded digital information; in the selected example, regions 136 represent binary ZEROS.

To read information out of storage medium 12, leads 134 are energized by read enable switch 112, shown in FIG. 9, which applies a lowered voltage of the same polarity, or zero voltage if desired, across electrodes 132 and 133. This voltage is well below the threshold of capacitive breakdown for the material of dielectric layer 130. Thus, with a positive potential applied to electron collecting grid 49 from preamplifier 113, shown in FIG. 9, more electrons are attracted to grid 49 when the electron beam impinges upon any of apertures 135, as compared to when the electron beam impinges upon any of regions 136, due to the different rates of secondary emission from the materials of metallic electrode 132 and semiconductive layer 131. Therefore, when the electron beam impinges upon any of apertures 135, the increased yield of secondary emission electrons from the exposed portion of lead oxide layer 131 causes a signal of greater amplitude to be detected by readout amplifier 114 in the apparatus of FIG. 9 than when the electron beam impinges upon any of regions 136 in electrode 132. Accordingly, impingement of the electron beam upon any of apertures 135 produces a large amplitude signal in the readout circuitry of the apparatus, while impingement of the electron beam upon any of regions 136 results in a low amplitude signal in the readout circuitry of the apparatus. By designating the large amplitude signals as being ONES and the small amplitude signals as being ZEROS, readout of data from storage medium 12 occurs in a straightforward manner. Moreover, the lowered voltage across electrodes 132 and 133 results in an electron beam spreading effect caused by the electrostatic fields surrounding each of apertures 135. This enhances detection of secondary emission electrons in that they are generally directed toward the secondary emission electron collecting grid instead of being permitted to emanate in all directions from the storage medium.

Although readout from storage medium 12 has been described, for illustrative purposes, as comprising detection of secondary emission electrons, it is clear that alternate methods of detection of data are also feasible in the instant invention. For example, readout of the device shown in FIG. 10 may be accomplished in the manner set forth in the aforementioned Skelly et al. application Ser. No. 749,457. Electron mirror methods of readout may also be employed, in the alternative, as set forth in S. P. Newberry Pat. No. 3,278,679, issued Oct. 11, 1966 and assigned to the instant assignee.

The foregoing describes a method and apparatus for achieving precise control of deflection of an electron beam over a large area without requiring any large angle deflection of the beam at any single location along the beam. The method and apparatus permit making rapid and accurate changes in location of impingement of an electron beam on a large area receiving surface, with capability of accurately positioning the point of impingement of an electron beam within a small portion of the large area receiving surface. The data storage and readout apparatus of the invention permits higher storage capacity than previously attainable with systems employing an electron beam for both reading and writing.

While only certain preferred features of the invention have been shown by way of illustration, many modifications and changes will occur to those skilled in the art. For example, while electrostatic beam deflection means have been illustrated, electromagnetic beam deflection means may be employed. Also, a semiconductive wafer may be substituted for the data storage medium for the purpose of facilitating fabrication of integrated circuits on the wafer. It is, therefore, to be understood that the appended claims are intended to cover all such modifica-

What is claimed is:

1. Apparatus for precisely controlling the point of impingement of an electron beam on a receiving surface comprising: means producing a beam of electrons directed toward a receiving surface; a first matrix of electron optical deflection means defining a plurality of electron beam paths spaced transversely with respect to the direction of travel of said beam between said first means and said receiving surface for controllably deflecting a beam of electrons transversing anyone of said plurality of beam paths and positioned between the electron beam producing means and said receiving surface; and at least a second matrix of electron optical deflection means positioned between said first matrix and said receiving surface, said second matrix also defining a plurality of transversely spaced electron beam paths; the number of electron optical deflection means of said second matrix being at least equal to the number of electron optical deflection means of said first matrix, and additional electron deflection means between said source and said first matrix for directing said beam to predetermined beam paths defined by said first matrix.

2. The apparatus of claim 1 including first electron beam collimating means positioned between said additional electron beam deflection means and said first matrix of electron optical deflection means, and second electron beam collimating means positioned between said first and second matrices of electron optical deflection means.

3. The apparatus of claim 1 including first circuit means coupled to said first matrix of electron optical deflection means for directing said beam of electrons toward a predetermined position on said second matrix of electron optical deflection means, and second circuit means coupled to said second matrix of electron optical deflection means for deflecting said beam of electrons to a predetermined position on said receiving surface.

4. The apparatus of claim 2 including first circuit means coupled to said first matrix of electron optical deflection means for directing said beam of electrons toward a predetermined position on said second matrix of electron optical deflection means, and second circuit means coupled to said second matrix of electron optical deflection means for deflecting said beam of electrons to a predetermined position on said receiving surface.

5. The apparatus of claim 4 including additional electron optical deflection means positioned between said first electron beam collimating means and said first matrix of electron optical deflection means for controllably aiming said electron beam at a predetermined position on said first matrix of electron optical deflection means.

6. The apparatus of claim 5 including means coupling said first circuit means to said additional electron optical deflection means so as to create an electric field at said additional electron optical effection means which is polarized oppositely to an electric field at said predetermined position on said first matrix of electron optical deflection means.

7. Apparatus for precisely controlling the point of impingement of an electron beam on a receiving surface comprising:
   means producing a beam of electrons directed toward a receiving surface;
   a first matrix electron optical deflection means positioned between the electron beam producing means and said receiving surface, said first matrix defining a plurality of electron beam paths spaced transversely with respect to the direction of travel of said beam between said first means and said receiving surface for controllably deflecting a beam of electrons transversing anyone of said plurality of beam paths;
   a second matrix of electron optical deflection means positioned between said first matrix and said receiving surface, said second matrix also defining a plurality of transversely spaced electron beam paths; and
   a third matrix of electron optical deflection means positioned between said first and second matrices, the number of electron optical deflection means of said first and third matrices being equal to each other but no greater than the number of electron optical deflection means of said second matrix.

8. The apparatus of claim 7 including first electron beam collimating means positioned between said electron beam producing means and said first matrix of electron optical deflection means, second electron beam collimating means positioned between said first and third matrices of electron optical deflection means, and third electron beam collimating means positioned between said third and second matrices of electron optical deflection means.

9. The apparatus of claim 7 including first circuit means coupled to said first matrix of electron optical deflection means for directing said beam of electrons toward a predetermined position on said third matrix of electron optical deflection means, second circuit means coupled to said second matrix of electron optical deflection means for deflecting said beam of electrons to a predetermined position on said receiving surface, and third circuit means coupled to said third matrix of electron optical deflection means for directing said beam of electrons emerging from said first matrix of electron optical deflection means toward a predetermined position on said second matrix of electron optical deflection means.

10. The apparatus of claim 8 including first circuit means coupled to said first matrix of electron optical deflection means for directing said beam of electrons toward a predetermined position on said third matrix of electron optical deflection means, second circuit means coupled to said second matrix of electron optical deflection means for deflecting said beam of electrons to a predetermined position on said receiving surface, and third circuit means coupled to said third matrix of electron optical deflection means for directing said beam of electrons emerging from said first matrix of electron optical deflection means toward a predetermined position on said second matrix of electron optical deflecting means.

11. The apparatus of claim 10 including additional electron optical deflection means positioned between said first electron beam collimating means and said first matrix of electron optical deflection means for controllably aiming said electron beam at a predetermined position on said first matrix of electron optical deflection means.

12. The apparatus of claim 11 including means coupling said first circuit means to said additional electron optical deflection means so as to create an electric field at said additional electron optical deflection means which is polarized oppositely to an electric field at said predetermined position on said first matrix of electron optical deflection means.

13. Apparatus for precisely controlling the point of impingement of an electron beam on a receiving surface comprising: means producing a beam of electrons directed toward a receiving surface; a first matrix of electron optical deflection means positioned between the electron beam producing means and said receiving surface; and a second matrix of electron optical deflection means positioned between said first matrix and said receiving surface, said second matrix including a plurality of submatrices of electron optical deflection means.

14. The apparatus of claim 13 including first circuit means coupled to said first matrix of electron optical deflection means for directing said beam of electrons toward a predetermined position on a selected submatrix in said second matrix of electron optical deflection means, and a second circuit means coupled to said second matrix of electron optical deflection means for deflecting said beam of electrons emerging from said selected submatrix to a predetermined position on said receiving surface.

15. Apparatus for precisely controlling the point of impingement of an electron beam on a receiving surface comprising: means producing a beam of electrons directed toward a receiving surface; a first matrix of electron optical deflection means positioned between the electron beam producing means and said receiving surface; a second matrix of electron optical deflection means positioned between said first matrix and said receiving surface, said second matrix comprising a plurality of submatrices of electron optical deflection means; and a third matrix of electron optical deflection means positioned between said first and second matrices.

16. The apparatus of claim 15 including first circuit means coupled to said first matrix of electron optical deflection means for directing said beam of electrons toward a predetermined position on said third matrix of electron optical deflection means, second circuit means coupled to each of said submatrices in said second matrix of electron optical deflection means for deflecting said beam of electrons to a predetermined position on said receiving surface, and third circuit means coupled to said third matrix of electron optical deflection means for directing said beam of electrons emerging from said first matrix of electron optical deflection means toward a predetermined position on a selected submatrix in said second matrix of electron optical deflection means.

17. A method for precisely controlling the point of impingement of an electron beam on a wide area receiving surface comprising the steps of: generating a beam of electrons directed toward a receiving surface; coarsely deflecting the beam of electrons in the general direction of a desired point of impingement on the receiving surface; finely deflecting the coarsely deflected beam of electrons toward the desired point of impingement so as to correct the path of said beam; and deflecting the finely deflected beam to impinge on said surface precisely at the desired point of impingement.

18. The method of claim 17 including the steps of focusing said beam of electrons prior to coarsely deflecting said electrons, and again focusing said beam of electrons subsequently to coarsely deflecting said electrons.

19. A method for precisely controlling the point of impingement of an electron beam on a receiving surface comprising the steps of generating a collimated beam of electrons directed toward a receiving surface; correcting the path of said electron beam to be substantially orthogonal with respect to the plane of said receiving surface at each of at least first and second deflection locations spaced along said path; and deflecting said beam of electrons emerging from said second deflection location toward a desired point of impingement on said receiving surface.

20. The method for precisely controlling the point of impingement of an electron beam on a receiving surface of claim 19 wherein said step of correcting the path of said electron beam to be substantially orthogonal to the plane of said receiving surface at each of said deflection locations comprises the step of focusing said electron beam prior to entry by said beam into said deflection locations.

References Cited

UNITED STATES PATENTS

| | | | |
|---|---|---|---|
| 2,669,675 | 2/1954 | Lawrence | 315—21 |
| 2,692,532 | 10/1954 | Lawrence | 315—21 |
| 2,811,668 | 10/1957 | McNaney | 315—21 X |
| 3,382,392 | 5/1968 | Corpew | 315—21 X |
| 3,407,331 | 10/1968 | Salgo | 315—21 |

OTHER REFERENCES

IBM Technical Disclosure, vol. 9, No. 2, July 1966, p. 155.

RODNEY D. BENNETT, JR., Primary Examiner

J. G. BAXTER, Assistant Examiner

U.S. Cl. X.R.

313—76, 78; 315—21